United States Patent
Pontes

(10) Patent No.: US 11,010,175 B2
(45) Date of Patent: May 18, 2021

(54) CIRCUITRY

(71) Applicant: Arm Limited, Cambridge (GB)

(72) Inventor: Julian Jose Hilgemberg Pontes, Antibes (FR)

(73) Assignee: ARM Limited, Cambridge (GB)

( * ) Notice: Subject to any disclaimer, the term of this patent is extended or adjusted under 35 U.S.C. 154(b) by 79 days.

(21) Appl. No.: 16/278,992

(22) Filed: Feb. 19, 2019

(65) Prior Publication Data
US 2019/0265983 A1    Aug. 29, 2019

(30) Foreign Application Priority Data

Feb. 26, 2018   (EP) .................................. 18158642

(51) Int. Cl.
| | |
|---|---|
| *G06F 9/445* | (2018.01) |
| *G06F 1/10* | (2006.01) |
| *G06F 1/28* | (2006.01) |
| *G06F 11/07* | (2006.01) |
| *G06F 11/16* | (2006.01) |

(Continued)

(52) U.S. Cl.
CPC ............ *G06F 9/44505* (2013.01); *G06F 1/10* (2013.01); *G06F 1/28* (2013.01); *G06F 11/0757* (2013.01); *G06F 11/1675* (2013.01); *G06F 1/324* (2013.01); *G06F 1/3237* (2013.01); *G06F 1/3287* (2013.01); *G06F 1/3296* (2013.01); *G06F 11/0736* (2013.01); *G06F 11/1629* (2013.01); *G06F 11/18* (2013.01)

(58) Field of Classification Search
CPC ............................ G06F 11/0757; G06F 1/3237
See application file for complete search history.

(56) References Cited

U.S. PATENT DOCUMENTS 4,229,788 A * 10/1980 Consigli ................. G06F 13/26
                                                      377/26
4,958,273 A *  9/1990 Anderson ........... G06F 11/1666
                                                     710/113
(Continued)

FOREIGN PATENT DOCUMENTS

| EP | 0 717 358 | 6/1996 |
|---|---|---|
| WO | 2012/030787 | 3/2012 |

OTHER PUBLICATIONS

Extended Search Report for EP 18158642.1 dated Aug. 1, 2018, 9 pages.

*Primary Examiner* — Jaweed A Abbaszadeh
*Assistant Examiner* — Hyun Soo Kim
(74) *Attorney, Agent, or Firm* — Nixon & Vanderhye, P.C.

(57) ABSTRACT

Circuitry comprises control circuitry to control an operating state of a data handling device of a set of two or more redundant data handling devices configured to perform identical data handling functions; the control circuitry being configured to control an operating state of the respective controlled data handling device as a state transition from a current operating state of that data handling device to a target operating state in response to the issue of a respective state change signal; the control circuitry comprising a detector responsive to issue of the state change signal in respect of a first threshold number representing some but not all of the data handling devices, to detect whether the state change signal is issued in respect of a further one or more of the devices so that a second threshold number of data handling devices is reached.

13 Claims, 11 Drawing Sheets

(51) Int. Cl.
*G06F 1/324* (2019.01)
*G06F 1/3296* (2019.01)
*G06F 1/3237* (2019.01)
*G06F 11/18* (2006.01)
*G06F 1/3287* (2019.01)

(56) References Cited

U.S. PATENT DOCUMENTS

| | | | | |
|---|---|---|---|---|
| 5,699,510 | A * | 12/1997 | Petersen | G06F 11/1612 |
| | | | | 714/42 |
| 5,903,717 | A * | 5/1999 | Wardrop | G06F 11/1658 |
| | | | | 714/12 |
| 6,490,277 | B1 * | 12/2002 | Tzotzkov | G06F 1/30 |
| | | | | 370/360 |
| 7,877,627 | B1 * | 1/2011 | Freydel | G06F 11/182 |
| | | | | 714/11 |
| 8,180,867 | B2 * | 5/2012 | Wan | G06F 11/3062 |
| | | | | 709/217 |
| 2012/0054511 | A1 * | 3/2012 | Brinks | G06F 1/26 |
| | | | | 713/310 |
| 2013/0080796 | A1 * | 3/2013 | Matsubara | G06F 1/206 |
| | | | | 713/300 |

* cited by examiner

| | | |
|---|---|---|
| Q_STOPPED | = 000001 | |
| Q_EXIT | = 000010 | |
| Q_RUN | = 000100 | |
| Q_REQUEST | = 001000 | |
| Q_DENIED | = 010000 | |
| Q_CONTINUE | = 100000 | |

| | |
|---|---|
| Q_S_E | = 000011 |
| Q_E_R | = 000110 |
| Q_R_R | = 001100 |
| Q_R_S | = 000101 |
| Q_R_D | = 011000 |
| Q_D_C | = 110000 |
| Q_C_R | = 100100 |

CIRCUITRY

This application claims priority to EP Patent Application No. 18158642.1 filed Feb. 26, 2018, the content of which is hereby incorporated by reference.

BACKGROUND

The present disclosure relates to circuitry.

The communication between Power and Clock Domains of processing circuitry having controllable power and clock attributes is sometimes done using dedicated control signals such as so-called P/Q channels. The P/Q channels are responsible for ensuring that changes in the power operation mode (for example, a power switch off (PSO), dynamic voltage control, clock frequency scaling or simply block level clock gating) are carried out in a safe manner.

In the case of so-called Functional Safety (FuSa) architectures, some level of redundancy is often required to ensure that faults can at least be detected (as discrepancies between redundant instances of data processing apparatus) or corrected.

In the case of redundant clock and power control, problems can be caused if for example the P/Q channels of the redundant instances of data processing apparatus do not agree in their control operations.

SUMMARY

In an example arrangement there is provided circuitry comprising:

control circuitry to control an operating state of a data handling device of a set of two or more redundant data handling devices configured to perform identical data handling functions;

the control circuitry being configured to control an operating state of the respective controlled data handling device as a state transition from a current operating state of that data handling device to a target operating state in response to the issue of a respective state change signal;

the control circuitry comprising a detector responsive to issue of the state change signal in respect of a first threshold number representing some but not all of the data handling devices, to detect whether the state change signal is issued in respect of a further one or more of the devices so that a second threshold number of data handling devices is reached.

In another example arrangement there is provided a method comprising:

controlling an operating state of a data handling device of a set of two or more redundant data handling devices configured to perform identical data handling functions, as a state transition from a current operating state of that data handling device to a target operating state in response to the issue of a respective state change signal;

detecting, in response to issue of the state change signal in respect of a first threshold number representing some but not all of the data handling devices, whether the state change signal is issued in respect of a further one or more of the devices so that a second threshold number of data handling devices is reached.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
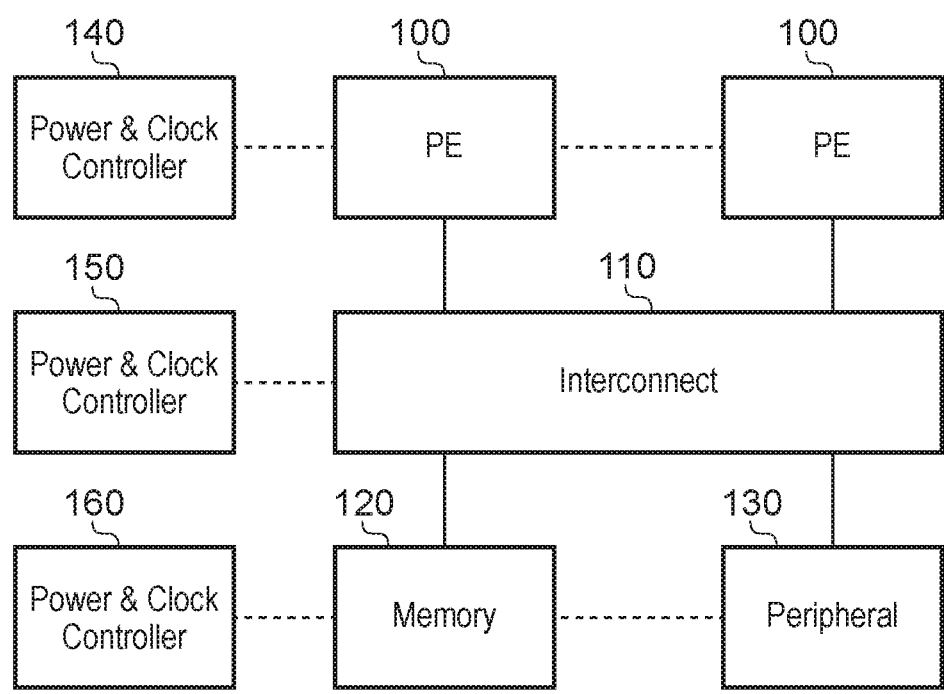
FIG. 1 schematically illustrates a data processing apparatus.

Before discussing the embodiments with reference to the accompanying figures, the following description of embodiments is provided.

An example embodiment provides circuitry comprising:

control circuitry to control an operating state of a data handling device of a set of two or more redundant data handling devices configured to perform identical data handling functions;

the control circuitry being configured to control an operating state of the respective controlled data handling device as a state transition from a current operating state of that data handling device to a target operating state in response to the issue of a respective state change signal;

the control circuitry comprising a detector responsive to issue of the state change signal in respect of a first threshold number representing some but not all of the data handling devices, to detect whether the state change signal is issued in respect of a further one or more of the devices so that a second threshold number of data handling devices is reached.

In example arrangements, to allow a state transition to be handled in a redundant system, when a first number of state change signals agree (where the first number could be one for example) then the control circuitry can start to detect whether a second greater number of state change signals agree, before moving to the target operating state. For example, the control circuitry can transition to the target operating state via a provisional state, so the control circuitry is configured to change the operating state of the respective data handling device to the target operating state in response to the detector detecting that the status signal is issued in respect of the second threshold number of data handling devices.

Note that the present techniques are particularly suited for use in so-called functional safety (FuSa) applications but are generally applicable to instances in which redundant circuitry is provided. The present techniques are particularly suited for use with (for example) so-called P/Q channel controllers, for example to control power and/or clock functionality of the controlled circuitry, but once again, they are generally applicable to the control of redundant data handling devices, for example (though not exclusively) using a state machine.

Example embodiments may be considered in connection with the following example summary:

Add an intermediate state AB between any state A and B if there is an arc going from A to B The Intermediate is reachable if threshold_1 is reached An arc between the intermediate state AB and A is possible if a guard condition defining the threshold_1 is no longer reached An arc from AB to B is added with a guard condition of threshold_2 is reached Note that this sequence may be applied to FuSa systems, and may or may not relate to one or both of a P and Q channel.

A threshold (maximum) time can be allowed in the provisional state before an error situation is detected (which would correspond to problems synchronising the redundant circuitries), so that in example arrangements the control circuitry may be configured to detect whether, within a threshold time period, the state change signal is issued in respect of the further one or more of the devices so that the second threshold number of data handling devices is reached and to change the operating state of the respective data handling device to the target operating state in response to the detector detecting that the status signal is issued in respect of the second threshold number of data handling devices within the threshold time period. The control circuitry may be configured to indicate a fault condition in response to the detector detecting that the status signal is issued in respect of fewer than the second threshold number of data handling devices within the threshold time period.

The state change signal may comprise one or both of:

a signal issued by the control circuitry to the respective controlled data handling device; and a signal issued by the respective controlled data handling device to the control circuitry.

In some examples, the state change signal may indicate one or more selected from the list consisting of:

a request by the control circuitry to the controlled data handling device to change operating state;

acceptance by the controlled data handling device of a requested change of operating state;

denial by the controlled data handling device of a requested change of operating state; and whether the controlled data handling device is currently active.

In some examples, the set of two or more redundant data handling devices comprises two or more instances of data processing apparatus to perform substantially identical processing operations in a redundant mode of operation, each instance having respective control circuitry. For example, each control circuitry may be configured to receive state change signals issued in respect of all of the instances of data processing apparatus. For example, the instances of data processing apparatus may comprise two instances of data processing apparatus; the first threshold number may be 1; and the second threshold number may be 2.

In a redundant system, there may be circumstances when redundancy is not required, for example in non-FuSa operations. In such situations, to avoid the circuitry stalling at a provisional state, signal routing circuitry may be configured to provide output signals generated by one instance of data processing apparatus as input signals to control circuitry of that instance of data processing apparatus in the case that another instance of data processing apparatus is currently in an inactive state.

In some example, there can be a hierarchy of control circuitries, in which a control circuitry higher in the hierarchy controls at least some operations of a control circuitry lower in the hierarchy.

In example arrangements, the operating state represents one or both of: a power control state; and a clock control state for the controlled data handling device. However, other aspects of operation of the controlled device could be used.

In example arrangements the control circuitry is configured to operate as a state machine, a current state of the state machine corresponding to an operating state of the controlled data handling device. For example, the control circuitry may be configured to enter a provisional state in response to issue of the state change signal in respect of the first threshold number of the data handling devices.

As potential outcomes of being in the provisional state, for example the control circuitry may be configured to transition from the provisional state so as to change the operating state of the respective data handling device to the target operating state in response to the detector detecting that the status signal is issued in respect of the second threshold number of data handling devices, for example within the threshold time period. Although the system could remain in the provisional state until this condition is met, another potential outcome is to transition from the provisional state to a state corresponding to the current operating state of the controlled device in response to the number of issued state change signals falling below the first threshold number.

To assist with the detection of erroneous states or state transitions, the control circuitry may be configured to store a representation of each operating state as a data vector having a single bit set to a predetermined value, and to store a representation of each provisional state as a data vector having two bits set to the predetermined value, in which, for a given provisional state, the two bits corresponding to the single bit of the current operating state which the control circuitry transitions from to enter the given provisional state and the single bit of the target operating state to which the control circuitry transitions from the given provisional state. This can also allow the use of parity checks (for example, even parity for an intermediate or provisional state, odd parity for a target state) to detect whether an erroneous state has been entered.

In some examples, the threshold time may correspond to a configurable parameter of the control circuitry. In other examples, the control circuitry may be configured to derive the threshold time from at least an initial period of operation, in which the threshold time is subject to a configurable maximum threshold time.

Another example embodiment provides a method comprising:

controlling an operating state of a data handling device of a set of two or more redundant data handling devices configured to perform identical data handling functions, as a state transition from a current operating state of that data handling device to a target operating state in response to the issue of a respective state change signal; and detecting, in response to issue of the state change signal in respect of a first threshold number representing some but not all of the data handling devices, whether the state change signal is issued in respect of a further one or more of the devices so that a second threshold number of data handling devices is reached.

Referring now to the drawings, FIG. 1 schematically illustrates a data processing apparatus comprising one or more processing elements 100 connected via so-called interconnect circuitry 110 to other devices such as a memory 120 and a peripheral device 130. Note that the present techniques may be used with interconnect circuitry, but this is not a requirement and the techniques are more widely applicable than this.

So-called power and clock gating is used in the apparatus of FIG. 1, so that power and clock controllers 140, 150, 160 are used to control which portions of the various devices 100 . . . 130 are powered up and in operation at any time, and what clock signal they are operating under. To achieve this, the devices 100 . . . 130 may be considered as multiple power domains and multiple clock domains, such that portions of the circuitry within a particular power domain are handled collectively by the respective power and clock controller, and similarly portions of the circuitry within a single clock domain are handled collectively by the respective power and clock controller. Note that the power domains do not have to coincide with the clock domains, and that variations in the power supply can involve not only switching on and off the power supply to a particular power domain but also changing the supply voltage to a lower or higher supply voltage to that power domain. Similarly for a clock domain, an option is simply to switch on or off the clock to that clock domain (a process often referred to as gating the clock signal) but other options include varying the clock frequency by which that clock domain operates.

Figure 2:
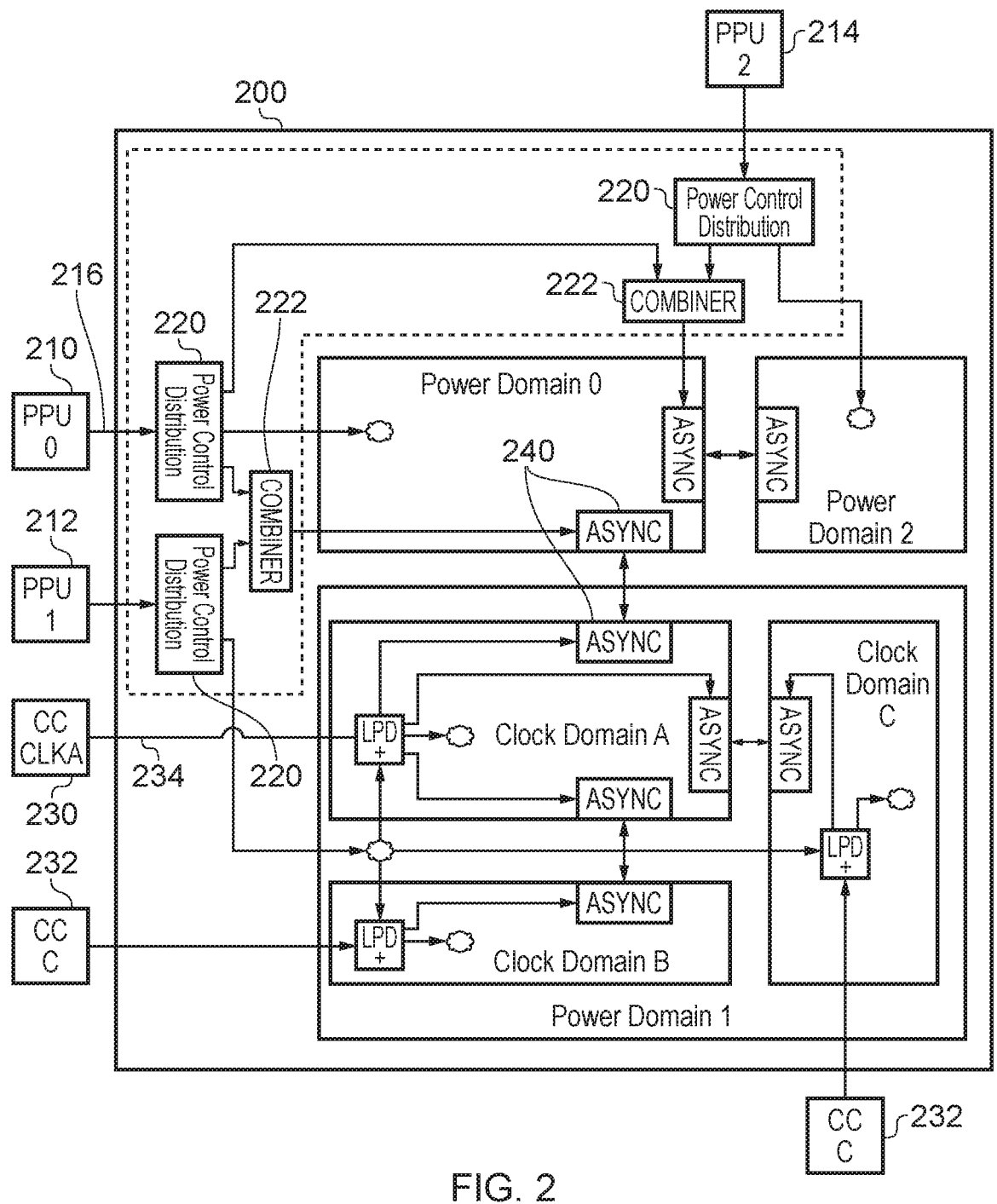
FIG. 2 schematically illustrates circuitry having multiple power and clock domains.

FIG. 2 schematically illustrates these techniques in more detail, and illustrates circuitry 200 having various power domains (power domain 0 . . . power domain 2) and various clock domains (A . . . C). Power control is by power controllers 210, 212, 214 which generate control signals such as a signal 216 indicative of power controlling operations. Note that these signals can be distributed to multiple destinations for example by distribution circuitry 220 and can be combined by combiner circuitry 222.

Similarly, clock controllers 230, 232 generate clock control signals 234 to control operation of the various clock domains. For communication between different clock domains, asynchronous communication interfaces 240 may be used. As with the power control, combiners and/or distribution circuitry may be used.

For a particular device subject to power or clock control, if the device is to be shut down, for example by removing the power supply and/or clock signal, it needs to be placed into a suitable state for a shut-down device. This can involve imposing barriers to inhibit data or other signals being provided to that shut-down device and can also involve placing the device into a suitable state so that when it is brought back into operation by the resumption of the power and clock signals, it will be able to synchronise to other powered-up devices.

Figure 3:
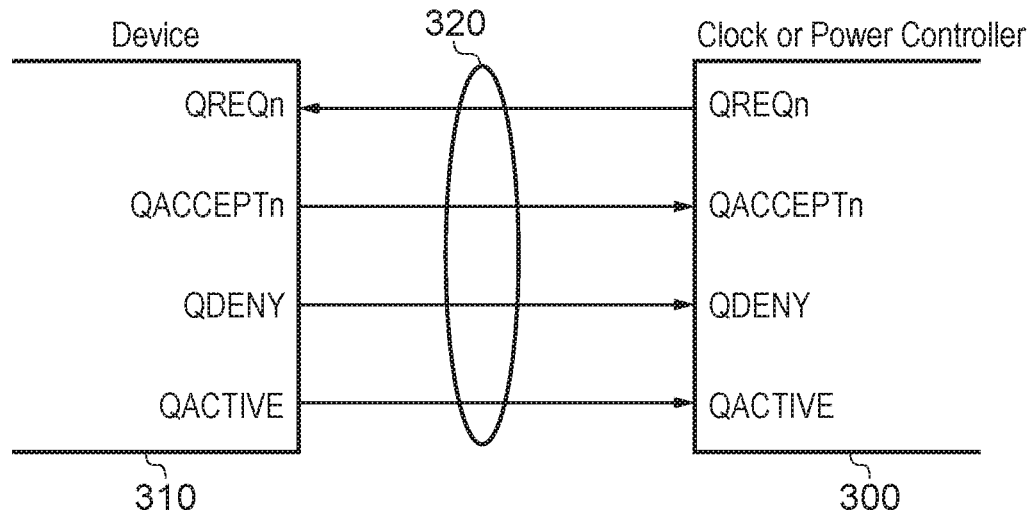
FIG. 3 schematically illustrates communication between a controller and a controlled device.

In order to try to ensure that the power and clock-controlled devices are always in a valid state, one option is for the clock or power controller 300 (FIG. 3) to communicate with the controlled device 310 by so-called P and Q channels. The Q channel data is used for straight forward switching operations, and the P channel is used for more detailed control. The Q channel will be discussed with reference to FIG. 3. The Q channel signals 320 can comprise one or both of a signal issued by the control circuitry to the respective controlled data handling device and a signal issued by the respective controlled data handling device to the control circuitry and in this example comprise the following:

QREQn: this is a signal sent from the controller to the controlled device to execute a power transition, for example to request the controlled device to enter or remain in a running or operational state (or, by the other state of QREQn, to power off), as an example of a request by the control circuitry to the controlled data handling device to change operating state QACCEPTn: this is a signal from the controlled device to the controller to accept a power transition request by the controller, as an example of acceptance by the controlled data handling device of a requested change of operating state QDENY: this is a signal from the controlled device to the controller to deny a power transition request by the controller, as an example of denial by the controlled data handling device of a requested change of operating state; and QACTIVE: this signal, generated by the controlled device, indicates that the controlled device is in an active or running state, as an example of whether the controlled data handling device is currently active.

The operating state may for example represent one or both of: a power control state; and a clock control state for the controlled data handling device.

Figure 4:
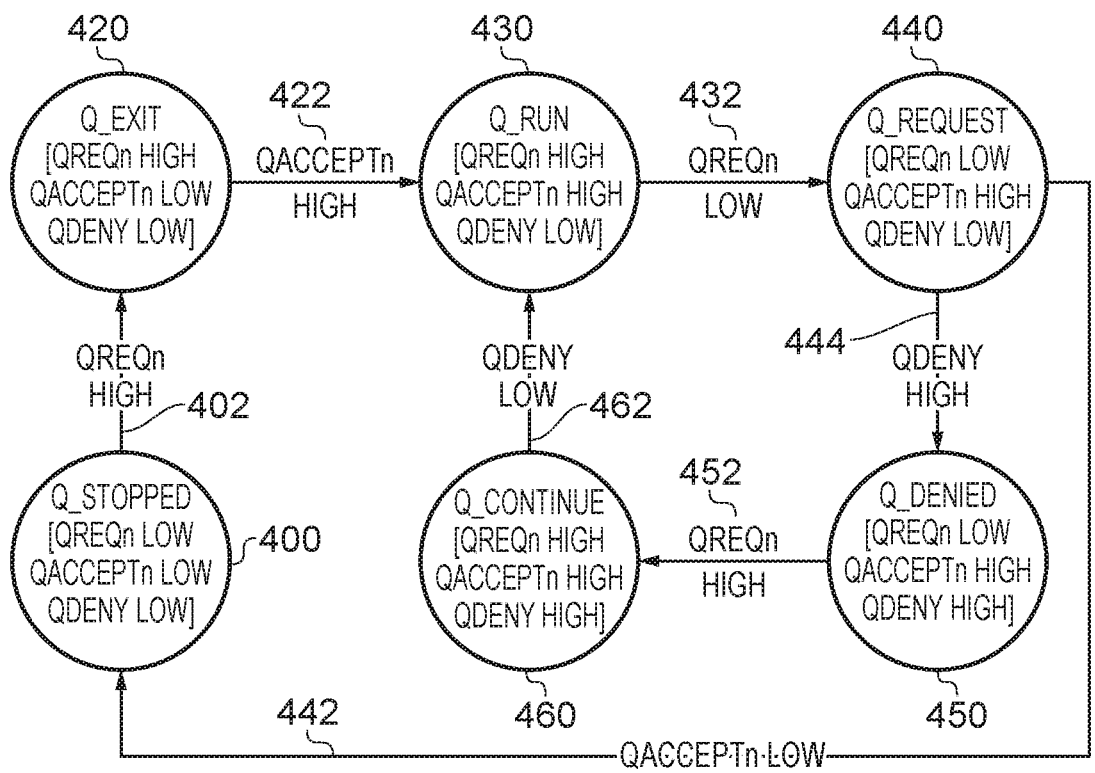
FIG. 4 is a schematic state diagram.

The way in which these signals are used will be described with reference to a state diagram representing operations of the clock or power control as a so-called state machine, as shown in FIG. 4. In this example, the control circuitry is configured to operate as a state machine, a current state of the state machine corresponding to an operating state of the controlled data handling device.

In FIG. 4, each circle represents a valid state of the state machine and also the controlled device. Transitions between states are subject to particular ones of the Q channel signals discussed above being asserted or having a particular value.

Starting from a state 400, which is a stopped state, the clock or power controller 300 can set the QREQn signal high so as to move by a transition 402 to an exit state 420. This represents the clock or power controller requesting the device to start running, but the state machine can move to the run state 430 only by the controlled device setting the QACCEPTn signal high 422.

Once in the run state 430, the clock or power controller 300 can request that the device leaves the run state by setting QREQn low 432 to enter a request state 440. From the request state, the control device can either accept the request or deny the request. In terms of accepting the request, the signal QACCEPTn is set low 442 and the system returns to the stop state 400. In terms of denying the request, the QDENY signal is set high 444 so that a denied state 450 is entered. From there, the clock or power controller sets the QREQn signal high 452 to acknowledge the denial of the request and to enter a continue state 460. The controlled device then sets QDENY low 462 to return to the run state.

The arrangement discussed so far concerns a single instance of circuitry being controlled by a corresponding instance of power and/or clock control.

In some applications, circuitry is replicated, for example in so-called "functional safety applications" (FuSa) such as processing devices or data processing circuitry for use in automotive or avionic applications. Here, at least parts of the circuitry are replicated two or more times, such that (in the example case of duplication) both sets of circuitry need to agree or an error is indicated, or (in the case of three or more instances) at least a majority of the circuitries need to agree in their processed outcome.

Note that the diagram of FIG. 4 can apply to a system using a Q channel for control; a different state diagram (and indeed a different state machine) could apply in instances where a P channel is used.

Figure 5:
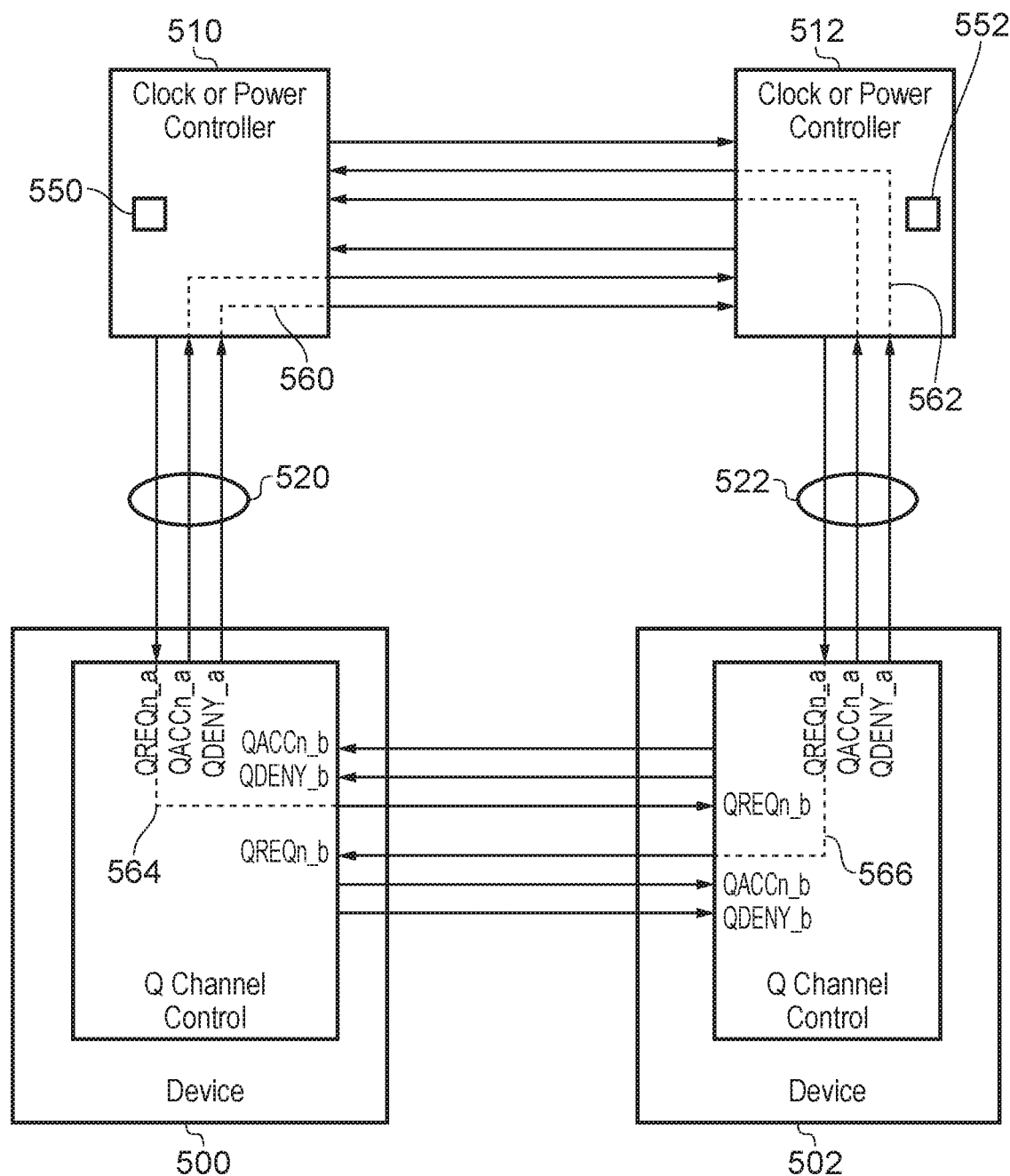
FIG. 5 schematically illustrates communication between controllers and controlled devices in a redundant apparatus.

In an example, not only are the processing elements of FIG. 1 replicated multiple times but also the interconnect circuitry and indeed the power and clock controllers. FIG. 5 is a schematic diagram illustrating a duplicated system in which a controlled device 500 is replicated as identical circuitry 502 performing the same operations (either simultaneously or with a temporal offset of a few clock cycles, for example), and similarly a clock or power controller 510 to control the device 500 is replicated by a clock or power controller 512 to control the device 502.

In a redundant system of this type, which may be referred to in some examples as a lock step system by which multiple instances of circuitry carry out the same operations, it is also important that corresponding clock and/or power control operations are provided to control the replicated devices 500, 502.

In the arrangement of FIG. 5, each device 500, 502 is controlled by a Q channel signal 520, 522 from a respective controller 510, 512, but at least some of the Q channel data is provided (for example by bypass paths 560, 562, 564, 566) to the "other" clock/power controller and to the "other" device.

FIG. 5 therefore provides an example of circuitry comprising:

control circuitry 510, 512 to control an operating state of a data handling device of a set of two or more redundant data handling devices 500, 502 configured to perform identical data handling functions; the control circuitry being configured to control an operating state of the respective controlled data handling device as a state transition from a current operating state of that data handling device to a target operating state in response to the issue of a respective state change signal; the control circuitry comprising a detector (to be discussed below with reference to FIGS. 7 and 11) responsive to issue of the state change signal in respect of a first threshold number representing some but not all of the data handling devices, to detect whether the state change signal is issued in respect of a further one or more of the devices so that a second threshold number of data handling devices is reached. For example, the control circuitry may be configured to change the operating state of the respective data handling device to the target operating state in response to the detector detecting that the status signal is issued in respect of the second threshold number of data handling devices.

Figure 6:
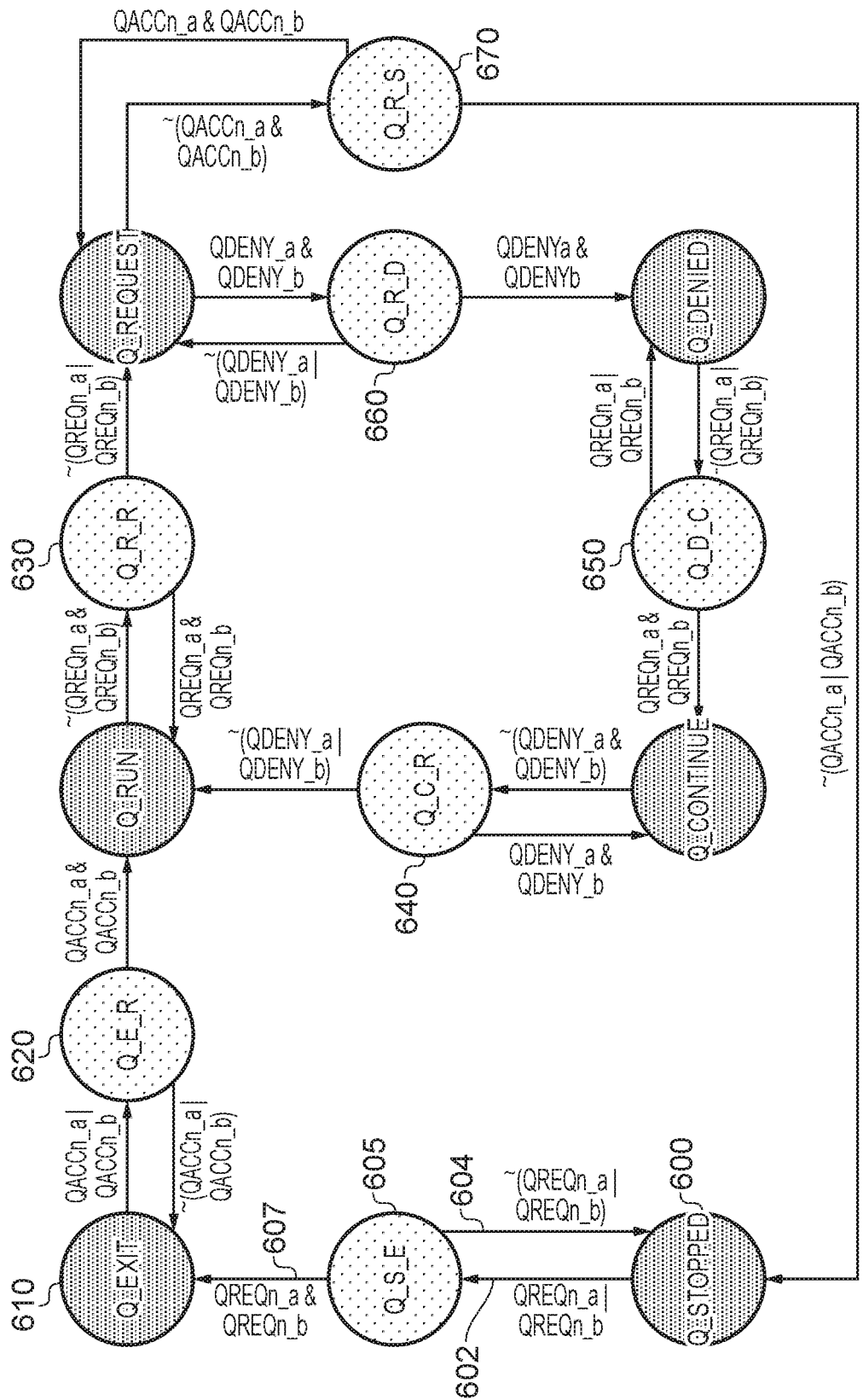
FIG. 6 is a schematic state diagram.

In the example of FIG. 6, the first threshold number may be 1 and the second threshold number may be 2. However, particularly in a system having greater redundancy (for example having more than two instances of redundant data processing apparatus) the thresholds could be such that the second threshold number is greater than the first threshold number, and the second threshold number may be less than or equal to the level of redundancy (the number of redundant instances of data processing apparatus).

FIG. 6 represents a modification of the states diagram of FIG. 4 to accommodate the arrangements of FIG. 5. In FIG. 6, the control circuitry is configured to enter a provisional state in response to issue of the state change signal in respect of the first threshold number (in this example, 1) of the data handling devices and may be configured to transition from the provisional state so as to change the operating state of the respective data handling device to the target operating state in response to the detector detecting that the status signal is issued in respect of the second threshold number (such as 2) of data handling devices, for example within a threshold time period.

Once again, starting from a stopped state 600 (similar to the state 400 of FIG. 4), the system or state machine does not progress directly to an exit state 610 (similar to the state 420 of FIG. 4). Instead, a provisional state 605 is entered, such that a transition from the stopped state 600 to the provisional state 605 is initiated by at least one of the request lines QREQn being set high 602. From the provisional state 605, when the other of the QREQ lines is set high 607 the state proceeds to the exit state.

Optionally, a return can be provided from the provisional state 605 to the stopped state 600 in that if the system detects that fewer than one of the QREQn lines is currently high 604 then the state returns from the provisional state 605 to the stopped state 600.

Comparing FIG. 4 and FIG. 6, a similar provisional state 620, 630, 640, 650, 660, 670 is provided as an intermediate stage corresponding to each state transition of FIG. 4. The provisional state is reached by (in this example) one of the two relevant signals being set to the state-changing condition, and an exit from the provisional state to the next state is achieved by both of the signals being set. Optionally, as discussed above, if the one signal which is set becomes unset, a return to the previous state may be provided. This provides an example in which the control circuitry is configured to transition from the provisional state to a state corresponding to the current operating state of the controlled device in response to the number of issued state change signals falling below the first threshold number.

Figure 7:
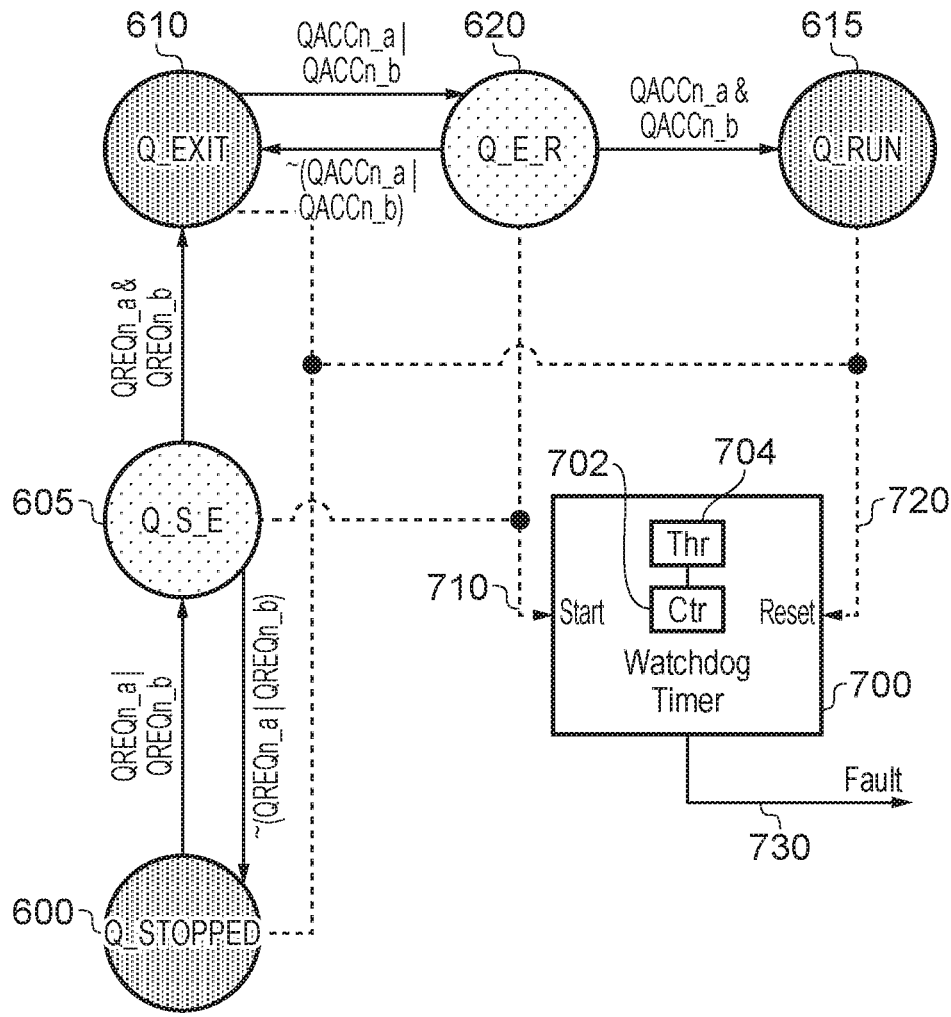
FIG. 7 schematically illustrates the operation of a controller.

FIG. 7 is a schematic representation of a portion of FIG. 6 showing just two transitions from the stopped state to the exit state and from the exit state 610 to the run state 615, in each case via a respective provisional state 605, 620.

Each clock/power controller has an associated timing circuitry 700 (shown in FIG. 5 as circuitry 550, 552). The timer is referred to as a "watchdog timer" in FIG. 7, in that it is checking for a timely progression from the provisional states 605, 620.

Entry into a provisional state 605, 620 (and the other corresponding provisional states in FIG. 6) initiates the start of a timing operation by setting a start signal 710 controlling the watchdog timer 700. Exit from a provisional state, which is to say entry into a final state 600, 610, 615 generates a reset signal 720 which stops the operation of the watchdog timer 700.

A processor 1130 (to be discussed below with reference to FIG. 11) may act as a detector responsive to issue of the state change signal in respect of a first threshold number representing some but not all of the data handling devices, to detect whether the state change signal is issued in respect of a further one or more of the devices so that a second threshold number of data handling devices is reached.

In between the setting of the start signals 710 and the setting of the reset signals 720, the watchdog timer 700 performs a counting operation (for example a count upwards) using a counter 702. The current count is compared to a threshold 704 and if the current count exceeds the threshold (in the example case of a count upwards), a fault signal 730 is generated. If the reset signal 720 is set before the counter reaches the threshold value then the count value is reset and no fault signal is generated.

In other words, the watchdog timer 700 detects whether the system spends more than a threshold amount of time in the provisional state 605 or 620 (or indeed any other of the provisional states shown in FIG. 6).

Given that the two devices 500, 502 are intended to be carrying out the same operations in synchronism (although optionally with a short delay of a predetermined number of cycles between the two sets of operations), spending too long in a provisional state 605, 620 is indicative that a synchronisation problem or a processing problem may have occurred such that the devices 500, 502 (or indeed the controllers 510, 512) are behaving differently to one another. This can be indicated by the fault signal 730 and appropriate action such as corrective action, rebooting, stopping operation or the like can be taken by the data processing apparatus.

The threshold 704 can be set as a configurable parameter of the apparatus.

In other examples, the watchdog timer 700 can be configured to detect in an initial period of operation the maximum period spent at any one of the provisional states and to set the threshold as a representation (in the counter domain) of that detected period, optionally plus a margin such as one cycle. A maximum allowable threshold period can be configurable in this case, such that if a longer period than the maximum allowable threshold is detected during the initial period of operation, the threshold time is set in dependence on the maximum allowable threshold rather than the actual detected time.

The use of the watchdog timer 700 provides an example in which the control circuitry is configured to detect whether, within a threshold time period, the state change signal is issued in respect of the further one or more of the devices so that the second threshold number of data handling devices is reached and to change the operating state of the respective data handling device to the target operating state in response to the detector detecting that the status signal is issued in respect of the second threshold number of data handling devices within the threshold time period. For example, the control circuitry may be configured to indicate a fault condition in response to the detector detecting that the status signal is issued in respect of fewer than the second threshold number of data handling devices within the threshold time period.

Note that in some instances, it might not be necessary (or may not be appropriate) to provide a provisional state between a pair of states, if for example an erroneous state change from one of those two states to the other would not give rise to a fault condition.

Figure 8:
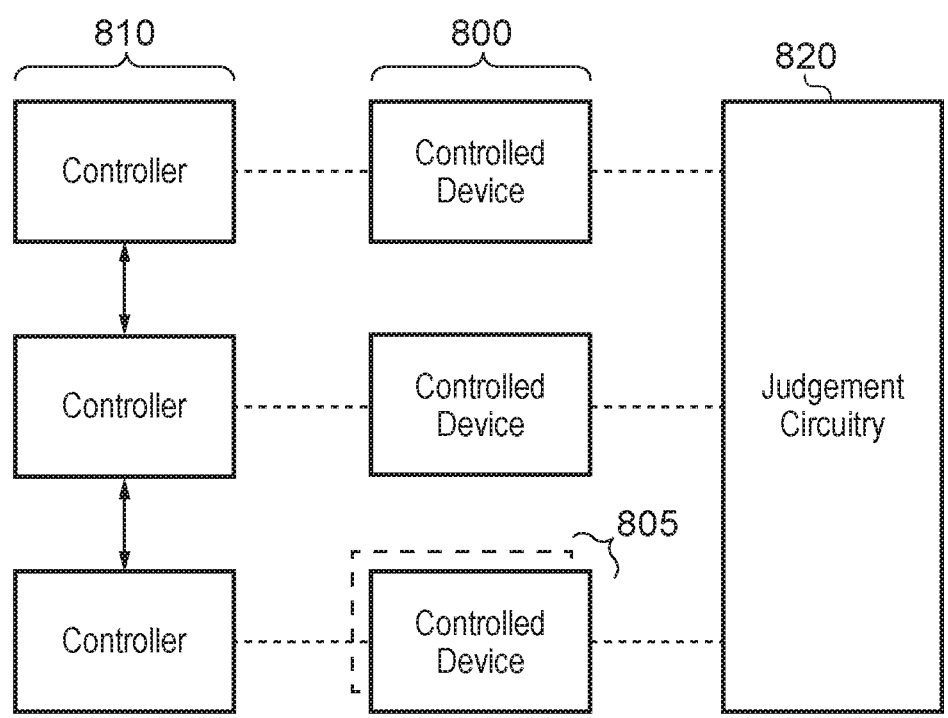
FIG. 8 schematically illustrates a data processing apparatus having more than two instances of replicated controlled devices each under the control of a clock/power controller.

FIG. 8 schematically illustrates a data processing apparatus having more than two instances of replicated controlled devices 800 each under the control of a clock/power controller 810. A majority or similar type of decision can be made by judgement circuitry 820 in the case that disagreement as to the processed result or outcome handled by the controlled device 800.

In some examples, a single controller can control multiple controlled devices 805.

Figure 9:
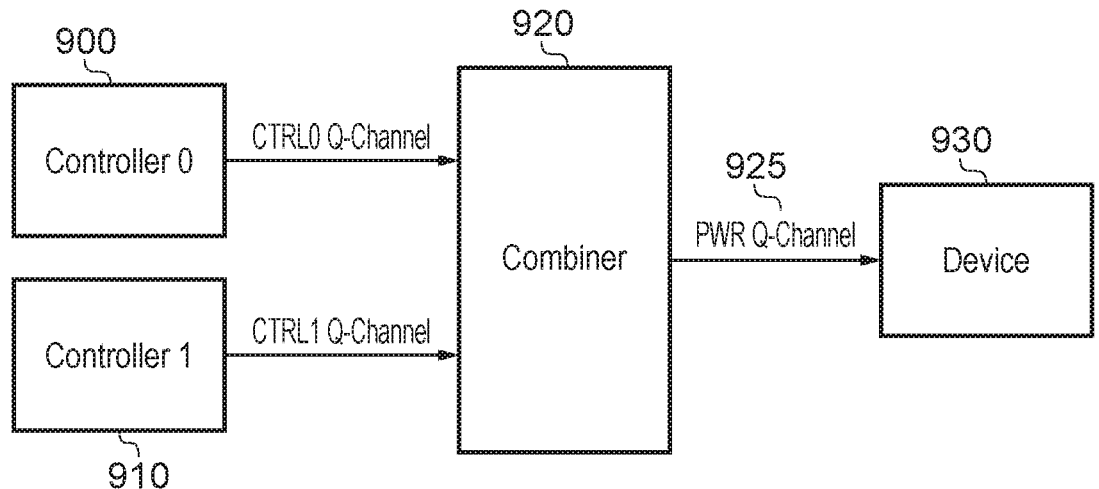
FIGS. 9 and 10 schematically illustrate further combinations of controller and controlled device.

In other examples, multiple controllers can control a single device (or more generally, n controllers can control m devices, where n and m are integers and may be the same or different). FIG. 9 schematically illustrates an example in which the output of two controllers 900, 910 are combined by a combiner 920 to generate a power control signal 925 to control a device 930. The arrangement of FIG. 9 could form one instance equivalent to a single instance of processing device and controller in the in the context of a FuSa system such as that of FIG. 5.

Figure 10:
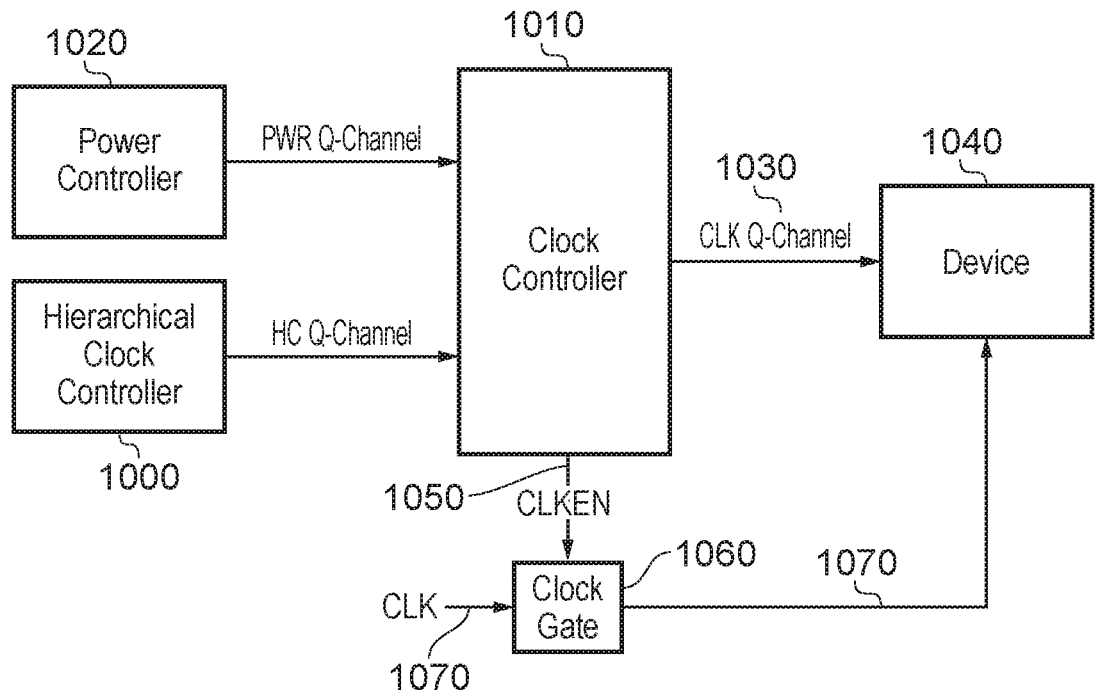

Similarly, a hierarchy of controllers can be provided, such that a controller (such as a clock controller 1000 in FIG. 10) controls a controller 1010 of the same functionality lower in the hierarchy (which is to say, a power controller controls a power controller, or a clock controller controls a clock controller in the hierarchy). The clock controller 1010 is also responsive to a power controller 1020 and provides a clock control signal 1030 to control a device 1030 and a clock enable signal 1050 to control a clock gate circuit 1060 which provides an overall gating of a clock signal 1070 to the device 1040. In this example, the clock on/off function is provided by the gating of the clock signal 1070, and the signal 1030 applies different clock states, for example defining different divisions of the clock signal 1070 into sub-frequencies. This is therefore an example comprising a hierarchy of control circuitries, in which a control circuitry higher in the hierarchy controls at least some operations of a control circuitry lower in the hierarchy.

Figures 11, 12A, 12B:
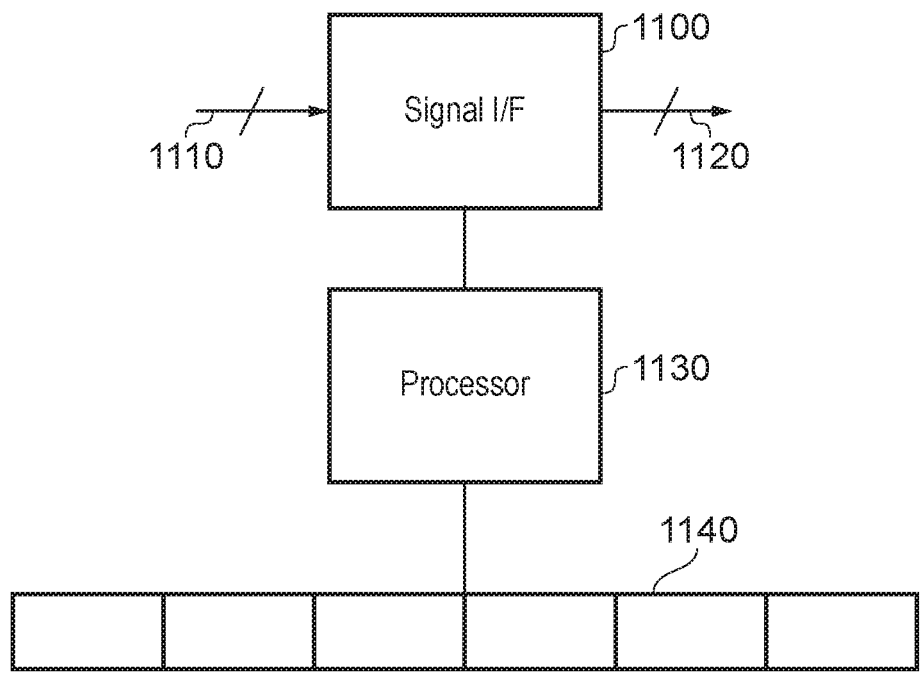
FIG. 11 schematically illustrates a controller.
FIGS. 12a and 12b schematically illustrate representations of respective states.

FIG. 11 provides a schematic diagram illustrating an example of a power or clock controller of the type discussed above. A signal interface 1100 handles the reception and sending of the Q signals 1110 (inputs) and 1120 (outputs) discussed above, including where appropriate providing the bypass paths 560 . . . 566 discussed above. A processor 1130 provides the functionality of the state machine (including detecting the conditions relating to the state change signals to prompt a change of state, and/or a change to or from a provisional state) and watchdog timer discussed above. A state register 1140 stores an indicator of the current state.

To make it easier to detect erroneous states or state transitions, the indicator stored in the state register can be arranged to allow fault or error detection, for example by the processor 1130. In some examples, this can be done by adding a parity scheme to the state encoding in a way that, for example, only an even bit vector value (that is to say, a vector of bits having an even number of ones) stored in the state register 1140 can be used to represent a state. In the event of a single event effect, an odd value would be generated, detected and signalled as an error.

Alternatively, a so-called one hot encoding can be used to the Original States 600, 610 . . . (corresponding to the states shown on FIG. 4). In a one hot encoded value, only one bit is a one in the vector stored in the register 1140.

For Intermediate or Provisional States two bits can be set. For example, these can be the "one hot" bits of the two neighbouring states (the state from which that provisional state was reached, and the destination state reached from that provisional state). Examples of the one hot encoding are shown in FIG. 12a, and of the encoding of the provisional states in FIG. 12b. For example the state machine used as an example in this description has originally six states so six bits may be used to represent it in the register 1140. An example valid representation would be as shown in FIG. 12a:

Q_STOPPED=000001
Q_EXIT=000010
Q_RUN=000100
Q_REQUEST=001000
Q_DENIED=010000
Q_CONTINUE=100000

The Intermediate States could be encoded as two bits, being the bits representing the neighbouring original states, for example as shown in FIG. 12b:

Q_S_E 605=000011
Q_E_R 620=000110
Q_R_R 630=001100
Q_R_S 670=000101
Q_R_D 660=011000
Q_D_C 650=110000
Q_C_R 640=100100

An instance of the contents of the register 1140 not reflecting one of these allowable vectors could be detected and flagged as an error by the controller.

The arrangement of FIGS. 11 to 12b can provide an example in which the control circuitry is configured to store a representation of each operating state as a data vector having a single bit set to a predetermined value, and to store a representation of each provisional state as a data vector having two bits set to the predetermined value, in which, for a given provisional state, the two bits corresponding to the single bit of the current operating state which the control circuitry transitions from to enter the given provisional state and the single bit of the target operating state to which the control circuitry transitions from the given provisional state.

An example of a so-called loopback mechanism for non FuSa operation will now be described with reference to FIGS. 13 to 15.

In some systems, it can be desirable to have the entire system selectively working in a non FuSa mode. For example, even if redundant hardware is provided for FuSa operation, the use of the redundant hardware increases the power consumption and this may be considered an unnecessary cost in situations when non-FuSa operations are being carried out. In such (non-FuSa) situations it could be desirable to have the redundant modules switched off, so that only a single instance of the processing is currently in operation.

Such a situation, when applied to the circuitry of FIG. 5, could potentially cause problems as the Q/P Channel signals of the main circuit and redundant copy must agree (or in an example using more than two redundant sets of circuitry, at least a threshold number must agree) in order to the state machine to progress from a provisional state to a next full state. But if some (or all but one) instances of circuitry are disabled for non-FuSa operation, such agreement may never be achieved.

To address this issue, a so-called loopback circuit activated in the non FuSa mode may be used. FIG. 13 illustrates an example apparatus similar to that of FIG. 5 except that lookback circuitry 1300, 1310 is provided. The loopback circuitry 1300, 1310 operates under the control of control signals 1320, 1330 which either enable (in a FuSa mode) or disable (in a non-FuSa mode) the operation of a redundant instance 1340 of controller and controlled device. Note that for clarity of the explanation, these signals are shown separately in FIG. 13, but they could of course be provided as Q/P signals via hierarchical clock and/or power controllers (not shown).

Figure 13:
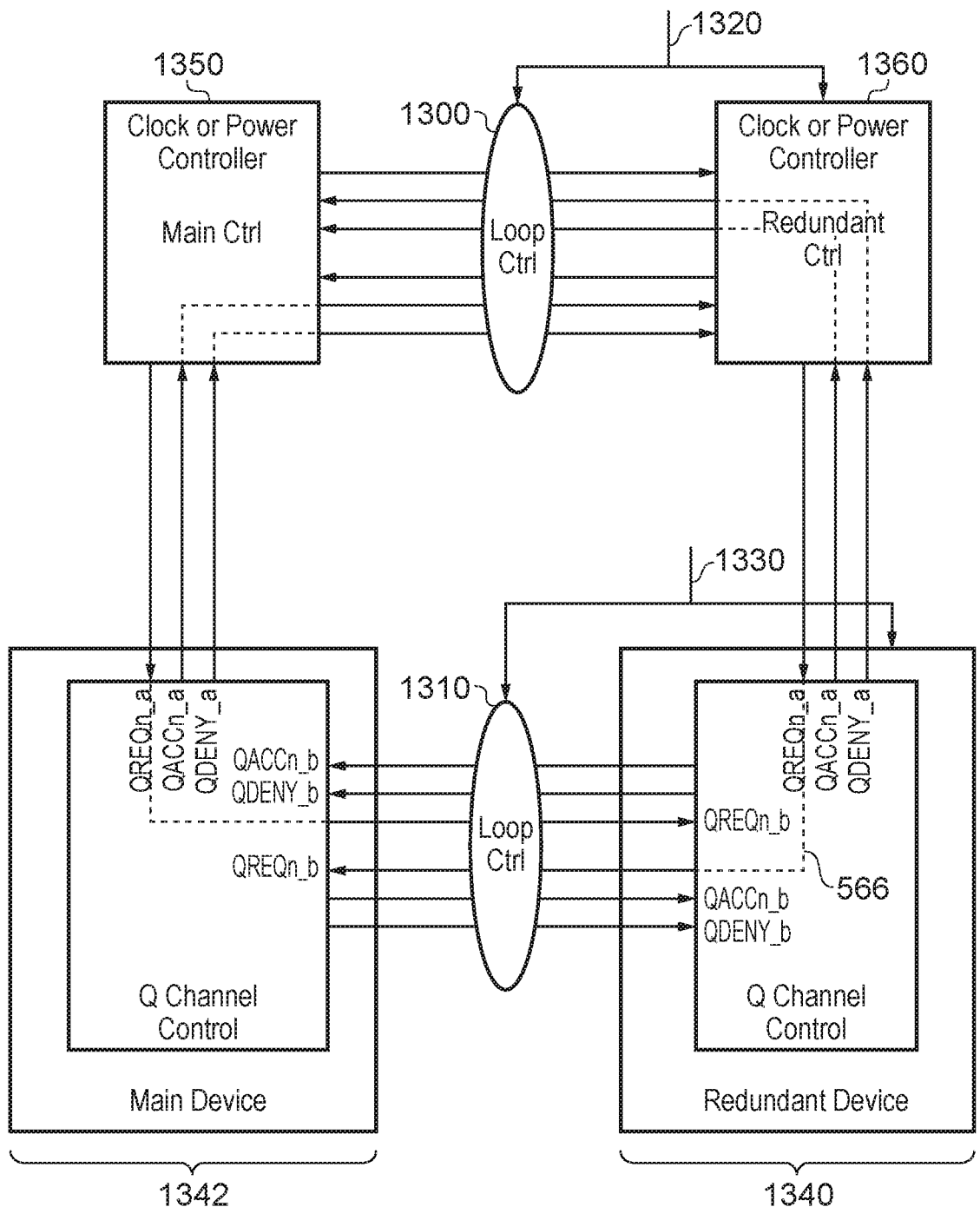
FIGS. 13 to 15 schematically illustrate the operation of selectively redundant circuitry.

Note that FIG. 13 shows two instances 1340, 1342 of data processing apparatus, such that each carries out substantially identical processing operations. Note that each instance may have one or more controllers and one or more controlled devices. In general, the set of two or more redundant data handling devices comprises two or more instances of data processing apparatus to perform substantially identical processing operations in a redundant mode of operation, each instance having respective control circuitry. Each instance 1340, 1342 . . . has control circuitry configured to receive state change signals issued in respect of all of the instances of data processing apparatus.

Figure 14:
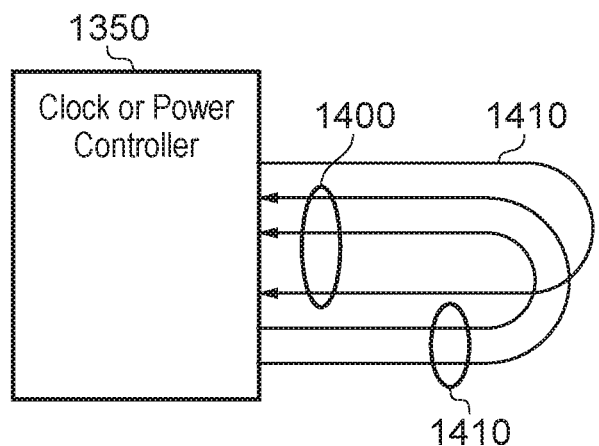
Figure 15:
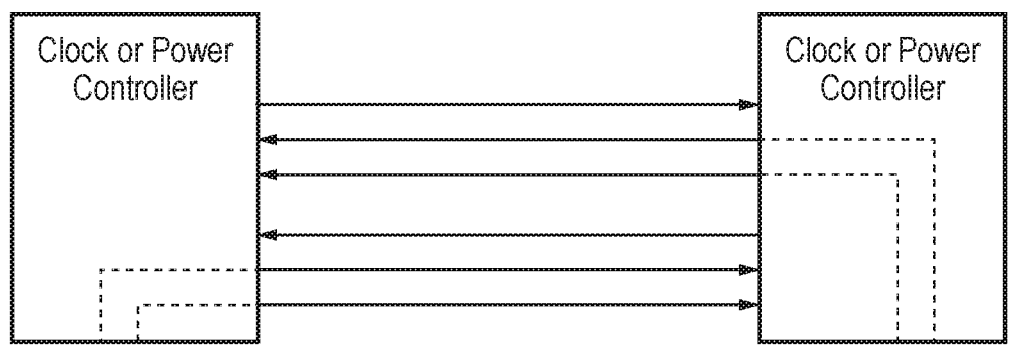

FIG. 14 schematically illustrates the operation of the loopback circuitry 1300 in the situation that the instance 1340 of circuitry (including a controller 1360) is disabled. The inputs 1400 to the still-active clock controller 1350 that would otherwise have been expected from the disabled controller 1360 are provided as replications or looped-back versions of the equivalent outputs 1410 of the same controller 1350. A similar arrangement is provided for signals expected by the still-active device 1370, using the loopback circuitry 1310.

In the event that the instance 1340 is active, for example in FuSa operation or any other type of operation in which redundancy is used, the loopback circuitry simply forwards the outputs of one controller to the other in the manner of FIG. 5.

The loopback circuitry 1300, 1310 can be combinational to avoid so-called single event effects, which means that only glitches from single event effects would be generated in case of radiation crossing the loopback circuitry.

By providing the loopback circuitry in this way, the system can progress from an intermediate or provisional state to a destination state even if one or more instances of processing are disabled, for example in a non-FuSa operational mode.

The loopback circuitry 1300, 1310 provides an example of signal routing circuitry configured to provide output signals generated by one instance of data processing apparatus as input signals to control circuitry of that instance of data processing apparatus in the case that another instance of data processing apparatus is currently in an inactive state.

Figure 16:
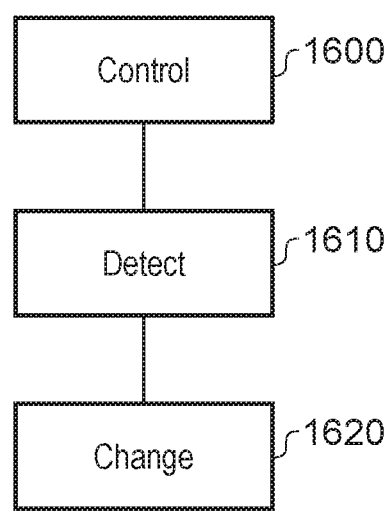
FIG. 16 is a schematic flowchart illustrating a method.

FIG. 16 is a schematic flowchart illustrating a method comprising:

controlling (at a step 1600) an operating state of a data handling device of a set of two or more redundant data handling devices configured to perform identical data handling functions, as a state transition from a current operating state of that data handling device to a target operating state in response to the issue of a respective state change signal;

detecting (at a step 1610), in response to issue of the state change signal in respect of a first threshold number representing some but not all of the data handling devices, whether the state change signal is issued in respect of a further one or more of the devices so that a second threshold number of data handling devices is reached; and optionally:

changing (at a step 1620) the operating state of the respective data handling device to the target operating state in response to a detection that the status signal is issued in respect of the second threshold number of data handling devices within the threshold time period.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

Various respective aspects of the present disclosure are defined by the following numbered clauses:

1. Circuitry comprising:
    control circuitry to control an operating state of a data handling device of a set of two or more redundant data handling devices configured to perform identical data handling functions;
    the control circuitry being configured to control an operating state of the respective controlled data handling device as a state transition from a current operating state of that data handling device to a target operating state in response to the issue of a respective state change signal;
    the control circuitry comprising a detector responsive to issue of the state change signal in respect of a first threshold number representing some but not all of the data handling devices, to detect whether the state change signal is issued in respect of a further one or more of the devices so that a second threshold number of data handling devices is reached.

2. Circuitry according to clause 1, in which the control circuitry is configured to change the operating state of the respective data handling device to the target operating state in response to the detector detecting that the status signal is issued in respect of the second threshold number of data handling devices.

3. Circuitry according to clause 1, in which the control circuitry is configured to detect whether, within a threshold time period, the state change signal is issued in respect of the further one or more of the devices so that the second threshold number of data handling devices is reached and to change the operating state of the respective data handling device to the target operating state in response to the detector detecting that the status signal is issued in respect of the second threshold number of data handling devices within the threshold time period.

4. Circuitry according to clause 3, in which the control circuitry is configured to indicate a fault condition in response to the detector detecting that the status signal is issued in respect of fewer than the second threshold number of data handling devices within the threshold time period.

5. Circuitry according to clause 1, in which the state change signal comprises one or both of:
    a signal issued by the control circuitry to the respective controlled data handling device; and
    a signal issued by the respective controlled data handling device to the control circuitry.

6. Circuitry according to clause 5, in which the state change signal indicates one or more selected from the list consisting of:
    a request by the control circuitry to the controlled data handling device to change operating state;
    acceptance by the controlled data handling device of a requested change of operating state;
    denial by the controlled data handling device of a requested change of operating state; and
    whether the controlled data handling device is currently active.

7. Circuitry according to clause 1, in which the set of two or more redundant data handling devices comprises two or more instances of data processing apparatus to perform substantially identical processing operations in a redundant mode of operation, each instance having respective control circuitry.

8. Circuitry according to clause 7, in which each control circuitry is configured to receive state change signals issued in respect of all of the instances of data processing apparatus.

9. Circuitry according to clause 8, comprising signal routing circuitry configured to provide output signals generated by one instance of data processing apparatus as input signals to control circuitry of that instance of data processing apparatus in the case that another instance of data processing apparatus is currently in an inactive state.

10. Circuitry according to clause 1, comprising a hierarchy of control circuitries, in which a control circuitry higher in the hierarchy controls at least some operations of a control circuitry lower in the hierarchy.

11. Circuitry according to clause 1, in which the operating state represents one or both of:
    a power control state; and
    a clock control state
    for the controlled data handling device.

12. Circuitry according to clause 1, in which the control circuitry is configured to operate as a state machine, a current state of the state machine corresponding to an operating state of the controlled data handling device.

13. Circuitry according to clause 12, in which the control circuitry is configured to enter a provisional state in response to issue of the state change signal in respect of the first threshold number of the data handling devices.

14. Circuitry according to clause 13, in which the control circuitry is configured to transition from the provisional state so as to change the operating state of the respective data handling device to the target operating state in response to the detector detecting that the status signal is issued in respect of the second threshold number of data handling devices.

15. Circuitry according to clause 13, in which the control circuitry is configured to transition from the provisional state to a state corresponding to the current operating state of the controlled device in response to the number of issued state change signals falling below the first threshold number.

16. Circuitry according to clause 12, in which the control circuitry is configured to store a representation of each operating state as a data vector having a single bit set to a predetermined value, and to store a representation of each provisional state as a data vector having two bits set to the predetermined value, in which, for a given provisional state, the two bits corresponding to the single bit of the current operating state which the control circuitry transitions from to enter the given provisional state and the single bit of the target operating state to which the control circuitry transitions from the given provisional state.

17. Circuitry according to clause 7, in which:
    the instances of data processing apparatus comprise two instances of data processing apparatus;
    the first threshold number is 1; and
    the second threshold number is 2.

18. Circuitry according to clause 1, in which the threshold time corresponds to a configurable parameter of the control circuitry.

19. Circuitry according to clause 1, in which the control circuitry is configured to derive the threshold time from at least an initial period of operation, in which the threshold time is subject to a configurable maximum threshold time.

20. A method comprising:
    controlling an operating state of a data handling device of a set of two or more redundant data handling devices configured to perform identical data handling functions, as a state transition from a current operating state of that data handling device to a target operating state in response to the issue of a respective state change signal;
    detecting, in response to issue of the state change signal in respect of a first threshold number representing some but not all of the data handling devices, whether the state change signal is issued in respect of a further one or more of the devices so that a second threshold number of data handling devices is reached.

The invention claimed is:

1. Circuitry comprising:
control circuitry to control an operating state of a data handling device of a set of two or more redundant data handling devices configured to perform identical data handling functions;
the control circuitry being configured to control an operating state of the respective controlled data handling device as a state transition from a current operating state of that data handling device to a target operating state in response to the issue of a respective state change signal;
the control circuitry comprising a detector responsive to issue of the state change signal in respect of a first threshold number representing some but not all of the data handling devices, to detect whether the state change signal is issued in respect of a further one or more of the data handling devices so that a second threshold number of data handling devices is reached;
in which the set of two or more redundant data handling devices comprises two or more instances of data processing apparatus to perform substantially identical processing operations in a redundant mode of operation, each instance having respective control circuitry, and in which each control circuitry is configured to receive state change signals issued in respect of all of the instances of data processing apparatus; and
the circuitry comprising signal routing circuitry configured to provide output state change signals generated by one instance of data processing apparatus as input state change signals to control circuitry of that instance of data processing apparatus so that the second threshold number of data handling devices can be reached in the case that another instance of data processing apparatus is currently in an inactive state.

2. Circuitry according to claim 1, in which the control circuitry is configured to change the operating state of the respective data handling device to the target operating state in response to the detector detecting that the status signal is issued in respect of the second threshold number of data handling devices.

3. Circuitry according to claim 1, in which the control circuitry is configured to detect whether, within a threshold time period, the state change signal is issued in respect of the further one or more of the devices so that the second threshold number of data handling devices is reached and to change the operating state of the respective data handling device to the target operating state in response to the detector detecting that the status signal is issued in respect of the second threshold number of data handling devices within the threshold time period.

4. Circuitry according to claim 3, in which the control circuitry is configured to indicate a fault condition in response to the detector detecting that the status signal is issued in respect of fewer than the second threshold number of data handling devices within the threshold time period.

5. Circuitry according to claim 1, in which the state change signal comprises one or both of:
a signal issued by the control circuitry to the respective controlled data handling device; and
a signal issued by the respective controlled data handling device to the control circuitry; and in which the state change signal indicates one or more selected from the list consisting of:
a request by the control circuitry to the controlled data handling device to change operating state;
acceptance by the controlled data handling device of a requested change of operating state;
denial by the controlled data handling device of a requested change of operating state; and
whether the controlled data handling device is currently active.

6. Circuitry according to claim 1, comprising a hierarchy of control circuitries, in which a control circuitry higher in the hierarchy controls at least some operations of a control circuitry lower in the hierarchy.

7. Circuitry according to claim 1, in which:
the control circuitry is configured to operate as a state machine, a current state of the state machine corresponding to an operating state of the controlled data handling device; and
the control circuitry is configured to enter a provisional state in response to issue of the state change signal in respect of the first threshold number of the data handling devices.

8. Circuitry according to claim 7, in which the control circuitry is configured to transition from the provisional state so as to change the operating state of the respective data handling device to the target operating state in response to the detector detecting that the status signal is issued in respect of the second threshold number of data handling devices.

9. Circuitry according to claim 7, in which the control circuitry is configured to transition from the provisional state to a state corresponding to the current operating state of the controlled device in response to the number of issued state change signals falling below the first threshold number.

10. Circuitry according to claim 7, in which the control circuitry is configured to store a representation of each operating state as a data vector having a single bit set to a predetermined value, and to store a representation of each provisional state as a data vector having two bits set to the predetermined value, in which, for a given provisional state, the two bits corresponding to the single bit of the current operating state which the control circuitry transitions from to enter the given provisional state and the single bit of the target operating state to which the control circuitry transitions from the given provisional state.

11. Circuitry according to claim 1, in which;
the instances of data processing apparatus comprise two instances of data processing apparatus;
the first threshold number is 1; and
the second threshold number is 2.

12. Circuitry according to claim 3, in which:
the threshold time period corresponds to a configurable parameter of the control circuitry; or
the control circuitry is configured to derive the threshold time period from at least an initial period of operation, in which the threshold time period is subject to a configurable maximum threshold time period.

13. A method comprising:
controlling an operating state of a data handling device of a set of two or more redundant data handling devices configured to perform identical data handling functions, as a state transition from a current operating state of that data handling device to a target operating state in response to the issue of a respective state change signal;

detecting, in response to issue of the state change signal in respect of a first threshold number representing some but not all of the data handling devices, whether the state change signal is issued in respect of a further one or more of the devices so that a second threshold number of data handling devices is reached;

in which the set of two or more redundant data handling devices comprises two or more instances of data processing apparatus to perform substantially identical processing operations in a redundant mode of operation, each instance having respective control circuitry, and in which each control circuitry is configured to receive state change signals issued in respect of all of the instances of data processing apparatus; and the method comprising providing output state change signals generated by one instance of data processing apparatus as input state change signals to control circuitry of that instance of data processing apparatus so that the second threshold number of data handling devices can be reached in the case that another instance of data processing apparatus is currently in an inactive state.

* * * * *